United States Patent [19]
Schlosser et al.

[11] Patent Number: 5,472,059
[45] Date of Patent: Dec. 5, 1995

[54] WHEEL END ASSEMBLY

[75] Inventors: Kraig J. Schlosser; James H. Sheets, both of Fort Wayne; Larry G. Sparks, Grabill, all of Ind.

[73] Assignee: Dana Corporation, Toledo

[21] Appl. No.: 196,946

[22] Filed: Feb. 15, 1994

[51] Int. Cl.$^6$ .............................. B60K 7/00; F16H 1/32; F16H 57/04
[52] U.S. Cl. .......................... 180/65.5; 475/159
[58] Field of Search .................. 180/65.5, 65.6; 475/159, 161

[56] References Cited

U.S. PATENT DOCUMENTS

| | | | |
|---|---|---|---|
| 3,055,448 | 9/1962 | Fagel | 180/10 |
| 3,387,502 | 6/1968 | Tourneau | 74/391 |
| 3,770,074 | 11/1973 | Sherman | 180/65.6 |
| 3,812,928 | 5/1974 | Rockwell et al. | 180/65.5 |
| 4,330,045 | 5/1982 | Myers | 180/65.5 |
| 4,406,340 | 9/1983 | Gennaux | 180/65.5 |
| 4,930,590 | 6/1990 | Love et al. | 180/55 |
| 5,156,579 | 10/1992 | Wakuta et al. | 180/65.5 |

*Primary Examiner*—Mitchell J. Hill
*Attorney, Agent, or Firm*—Oldham, Oldham & Wilson Co.

[57] ABSTRACT

A wheel end assembly for driving an individual wheel of a motor vehicle, with the assembly comprising a stationary, annular spindle which is operably affixable to the vehicle, a wheel hub rotatably mounted to and coaxial with the spindle, and an electric motor and axially spaced apart inboard and outboard speed reduction gear sets for driving the wheel hub and vehicle wheel at a speed less than the speed of the motor output shaft. The assembly further comprises a cartridge bearing disposed between the inboard and outboard gear sets with the wheel hub rotatably mounted to the spindle via the cartridge bearing. The wheel end assembly is advantageously configured to accommodate a brake assembly disposed in surrounding relationship with the cartridge bearing between the inboard and outboard gear sets and to minimize the assembly length from the cartridge bearing to the inboard end of the assembly which maximizes the available space from the centerline of the associated vehicle to the inboard end of the assembly for enhanced accommodation of vehicle design features.

14 Claims, 6 Drawing Sheets

WHEEL END ASSEMBLY

BACKGROUND OF THE INVENTION

1. Field of the Invention

The present invention relates generally to a wheel end assembly and, more particularly, to a wheel end assembly utilizing an electric motor in conjunction with inboard and outboard reduction gear sets to drive an individual wheel of a motor vehicle.

2. Related Art

A variety of wheel end assemblies are known in the art which utilize electric motors and double reduction gear sets, of the planetary type, to drive individual wheels of motor vehicles. However, based on the particular configuration of assembly components and/or the spacial relationship among individual components which defines the assembly envelope, prior wheel end assemblies are typically subject to one or more of the following disadvantages. Prior double reduction wheel end assemblies typically utilize a primary, or high-speed, reduction gear set of a conventional planetary type wherein a rotatable planet gear carrier provides the planetary output and a plurality of planet gears rotate with the carrier. In relatively high speed applications such assemblies have the disadvantages of requiring precise balancing of the planet carrier and creating relatively high centrifugal forces acting on the planet gears which may result in reduced gear bearing life and increased gear mesh noise relative to a planetary-type gear set utilizing a stationary planet carrier. The primary and secondary speed reduction gear sets of prior art double reduction wheel end assemblies are often positioned axially adjacent one another which, for a given vehicle wheel base and optimum wheel hub bearing location, can result in the assembly extending farther inboard than necessary which in turn may compromise design requirements of the associated vehicle. For instance, if such a wheel end assembly is utilized to drive a commercial bus wheel, the available space for the bus passenger aisle may be reduced. Additionally, other known wheel end assemblies are configured such that the load path for reacting the vehicle weight passes through at least one of the reduction gear sets resulting in undesirable gear mesh deflections. Further, the spacial relationship between other assembly elements, such as the brake means and the primary and secondary speed gear sets, may be such that an optimum packaging envelope of the assembly is not achieved.

In view of the foregoing disadvantages associated with prior wheel end assemblies, applicants' invention is herein presented.

SUMMARY OF THE INVENTION

The present invention is directed to a wheel end assembly for driving an individual wheel of a motor vehicle wherein the assembly is advantageously configured so as to minimize the distance from a bearing supporting the wheel hub to the inboard surface of the assembly which provides additional space to accommodate vehicle design features. According to a preferred embodiment of the present invention, the wheel end assembly comprises a stationary, annular spindle which is operably attached to the vehicle and an electric motor which is disposed inboard of, and supported by, the spindle. The motor has a stator and a rotor, with the rotor including a rotary output shaft. The assembly further comprises a wheel hub which is rotatably mounted to and coaxial with the spindle and a wheel hub cartridge bearing which is disposed between an enlarged diameter inboard portion of the spindle and the wheel hub, and in surrounding relationship with a reduced diameter outboard portion of the spindle. The wheel hub is fixedly attached to a rotatable outer race of the cartridge bearing. The assembly further comprises an inboard speed reduction gear set mounted within the enlarged diameter inboard portion of the spindle and coaxially with the spindle and an outboard speed reduction gear set which is also coaxial with the spindle. The inboard gear set connects coaxially between the output shaft of the motor and an intermediate shaft for rotating the intermediate shaft in response to rotation of the output shaft at a speed of rotation which is less than the speed of rotation of the output shaft. The outboard gear set connects coaxially between the intermediate shaft and the wheel hub for rotating the wheel hub and the wheel of the vehicle at a speed of rotation which is less than the speed of rotation of the intermediate shaft.

BRIEF DESCRIPTION OF THE DRAWINGS

The structural features and functions of the present invention, as well as the advantages derived therefrom, will become apparent from the subsequent detailed description of the preferred embodiments when taken in conjunction with the accompanying drawings in which.

DETAILED DESCRIPTION

Figure 1:
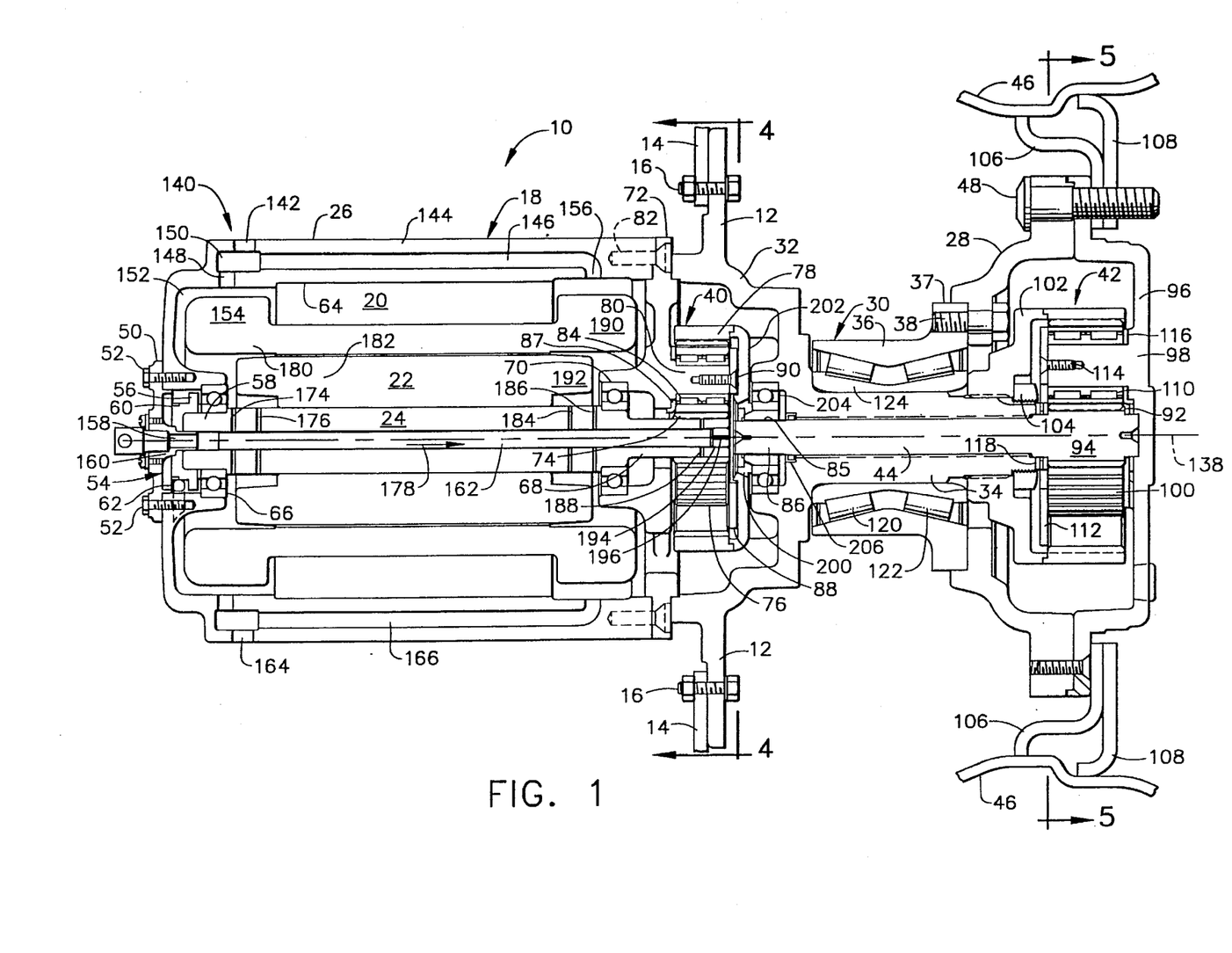
FIG. 1 is a longitudinal cross-section view illustrating a preferred embodiment of the wheel end assembly of the present invention.
Figure 2:
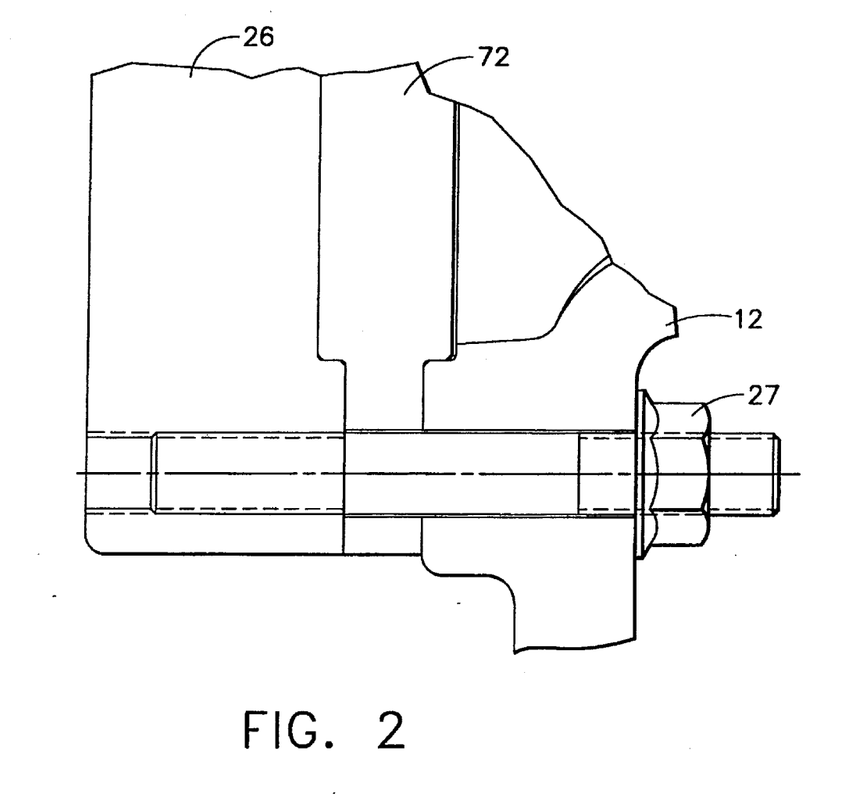
FIG. 2 is an enlarged view illustrating the attachment of the motor housing and inboard gear set planet carrier to the spindle, shown in FIG. 1.

Referring now to the drawings, wherein like reference numerals have been used for similar elements throughout, FIG. 1 is a longitudinal cross-section illustrating the wheel end assembly 10 of the present invention which is used for driving an individual wheel of a motor vehicle. Wheel end assembly 10 comprises a stationary, annular spindle 12 which is operably affixable to a suspension system 14 of a motor vehicle (not shown) by conventional means such as bolts 16. Wheel end assembly 10 further comprises an electric motor 18 having a stator 20 and a rotor 22, with rotor 22 including a rotary output shaft 24. Stator 20 and rotor 22 are enclosed within an exterior housing 26 of motor 18 wherein exterior housing 26 is fixedly attached to spindle 12 by conventional bolts 27, as shown in FIG. 2, such that spindle 12 supports motor 18. Motor 18, which is preferably an alternating current, induction-type motor, is disposed axially inboard and coaxial with spindle 12. Wheel end assembly 10 further comprises a wheel hub 28 which is coaxial with spindle 12 and rotatably mounted to spindle 12 with a wheel hub cartridge bearing 30 which is disposed between an enlarged diameter inboard portion 32 of spindle 12 and wheel hub 28. Cartridge bearing 30 further surrounds a reduced diameter outboard portion 34 of spindle 12. Wheel hub 28 is fixedly attached to a rotatable outer race 36 of cartridge bearing 30, at an outboard end 37 of outer race 36, by conventional bolts 38. Wheel end assembly 10 further comprises a primary, or inboard speed reduction gear set 40 and a secondary, or outboard speed reduction gear set 42. Inboard speed reduction gear set 40 is mounted within the enlarged diameter inboard portion 32 of spindle 12 and coaxially with spindle 12. Inboard gear set 40 is connected coaxially between output shaft 24 of motor 18 and an intermediate shaft 44 for rotating the intermediate shaft 44 in response to rotation of output shaft 24 of motor 18 at a speed rotation which is less than the speed of rotation of output shaft 24. Outboard speed reduction gear set 42 is coaxial with spindle 12 and is connected coaxially between intermediate shaft 44 and wheel hub 28 for rotating wheel hub 28 and wheel 46 of the vehicle (not shown), wherein wheel 46 is operably affixable to wheel hub 28 with conventional bolts 48, at a speed of rotation which is less than the speed of rotation of intermediate shaft 44.

An end plate assembly 50 is fixedly attached to exterior housing 26 of motor 18 by conventional means such as bolts 52. End plate assembly 50 seals the inboard end of motor 18 in the area of output shaft 24, provides a means for externally routing the signal leads (not shown) from an encoder 54 and provides a means for supplying lubricating fluid to assembly 10 as subsequently discussed. Encoder 54 comprises a tone wheel 56 which slidingly engages an outboard end 58 of output shaft 24 and includes toothed serrations 60 which are aligned with an optical sensor 62 for purposes of signaling the orientation of rotor 22 to the control unit (not shown) of motor 18.

In a preferred embodiment exterior housing 26 of motor 18 is made of an aluminum alloy and stator 20 is made of a steel alloy having a lower coefficient of thermal expansion than that of housing 26. Accordingly, housing 26 tends to grow radially apart from stator 20 at elevated operating temperatures of motor 18. To accommodate this differential radial growth, exterior housing 26 engages stator 20 in an interference fit along a radially inner and axially extending surface 64 of exterior housing 26 in contrast to prior devices which typically mount the motor stator to its housing using bolts which results in additional parts and costs relative to housing 26 and stator 20 of the present invention.

Inboard end 58 of output shaft 24 is supported by roller bearing 66 which is disposed between exterior housing 26 and output shaft 24. The outboard end 68 of output shaft 24 is supported by roller bearing 70 disposed between a stationary planet carrier 72 of inboard gear set 40 and outboard end 68.

Figure 4:
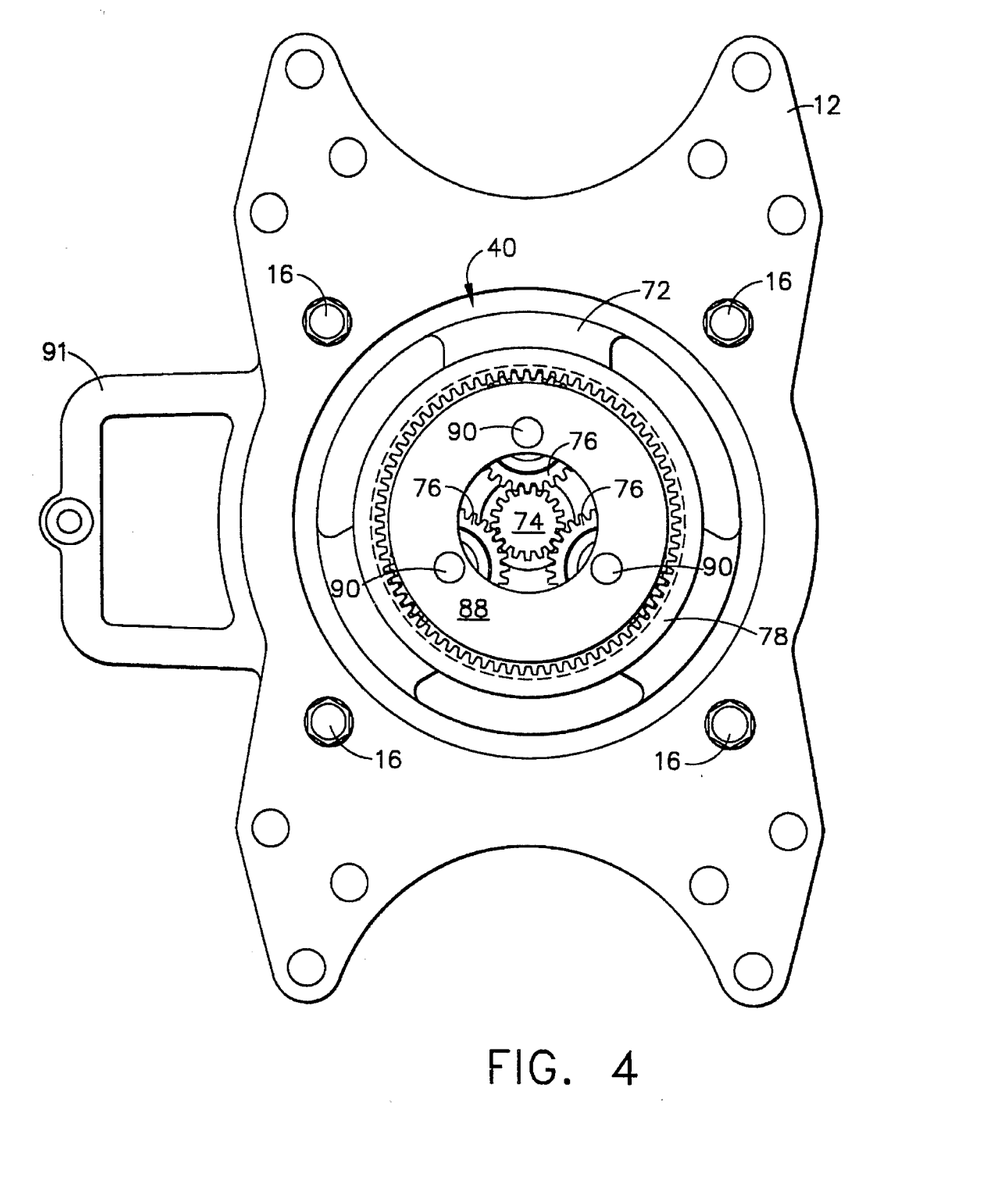
FIG. 4 is a view taken along line 4—4 in FIG. 1 illustrating the inboard gear set of the present invention.

Referring now to FIGS. 1 and 4 (which omits suspension system 14), it may be seen that inboard gear set 40 comprises a sun gear 74 which is integral with output shaft 24 of motor 18, a stationary planet carrier 72, a plurality of planet gears 76 and a rotatable ring gear 78. Sun gear 74 provides the input to inboard gear set 40 due to rotation of output shaft 24. Each of the planet gears 76 are rotatable about a corresponding one of axially extending pins 80 which are integrally formed with planet carrier 72. Stationary planet carrier 72 is supported by, and fixedly attached to and between spindle 12 and motor exterior housing 26 by bolts 27. Additionally, planet carrier 72 is fixedly attached to exterior housing 26 by a plurality of bolts 82 which secures gear set 40 to motor 18 at a sub-assembly level prior to the attachment of spindle 12. Planet gears 76 are rotatably mounted to pins 80 by a double set of needle bearings 84 and each of the planet gears 76 mesh with sun gear 74 and ring gear 78, wherein rotatable ring gear 78 provides the output of inboard gear set 40 and meshes with splines 85 formed on an inboard end 86 of intermediate shaft 44 for driving intermediate shaft 44 in response to rotation of ring gear 78. Since planet carrier 72 is stationary and the output of gear set 40 is provided by ring gear 78, gear set 40 is not a conventional planetary-type gear set but instead is a planetary-type gear set known as a star gear set. The speed reduction which may be achieved by gear set 40 is reduced relative to a conventional planetary-type gear set but gear set 40 may be advantageously utilized in the present invention due to the relatively high speed operation of motor 18 which may be operated at speeds up to approximately 10,000–15,000 rpm.

However, it is to be appreciated that a conventional planetary gear set can utilized in place of gear set 40 in which case, planet carrier 72 would be rotating requiring precision balancing to avoid vibration problems. Furthermore, the use of a conventional planetary gear set in this applications may cause the problems and deficiencies not in the background of the Invention and relating to the prior art.

FIG. 1 illustrates planet gears 76 to be conventional spur gears but it should be understood that planet gears 76 may alternately comprise helical gears in accordance with the present invention thereby affording the advantages of reduced gear noise and increased strength which are associated with helical gears. Accordingly, it is necessary to provide a means for restraining planet gears 76 from moving either inboard or outboard due to side loads created by helical gears. This is accomplished in the present invention by a plurality of thrust washers 87 disposed on the inboard side of gears 76 and a single thrust washer 88 disposed on the outboard side of gears 76. Each of the planet gears 76 is restrained from moving in an axially inboard direction by a corresponding one of thrust washers 87, wherein each thrust washer 87 is keyed to planet carrier 72 by an inner J-shaped lip engaging carrier 72. Outboard thrust washer 88 is fixedly attached to planet carrier 72 by a plurality of conventional screws 90 wherein a single screw 90 is used to attach washer 88 to each pin 80 of planet carrier 72, thereby avoiding relative motion between washer 88 and carrier 72. Washer 88 is advantageously utilized instead of a plurality of washers on the outboard side of planet gear 76 due to the rotatable nature of ring gear 78 and the lack of adjacent stationary structure which could be used to key individual washers. As shown in FIG. 4, an electrical lead housing 91 is attached to spindle 12 and is used to contain electrical leads (not shown) of motor 18.

It is noted that wheel end assembly 10 is modular in nature in the sense that common parts, comprising motor 18 and the previously described elements thereof, and inboard gear set 40 may be used with a wheel end assembly comprising a single speed reduction gear set with applications for smaller motor vehicles, such as pick-up trucks, wherein such an assembly may be created by attaching a suitable outboard cover assembly to planet carrier 72 and exterior housing 26 of motor 18 in lieu of spindle 12 with the end cover assembly being operably affixable to suspension system 14.

Figure 5:
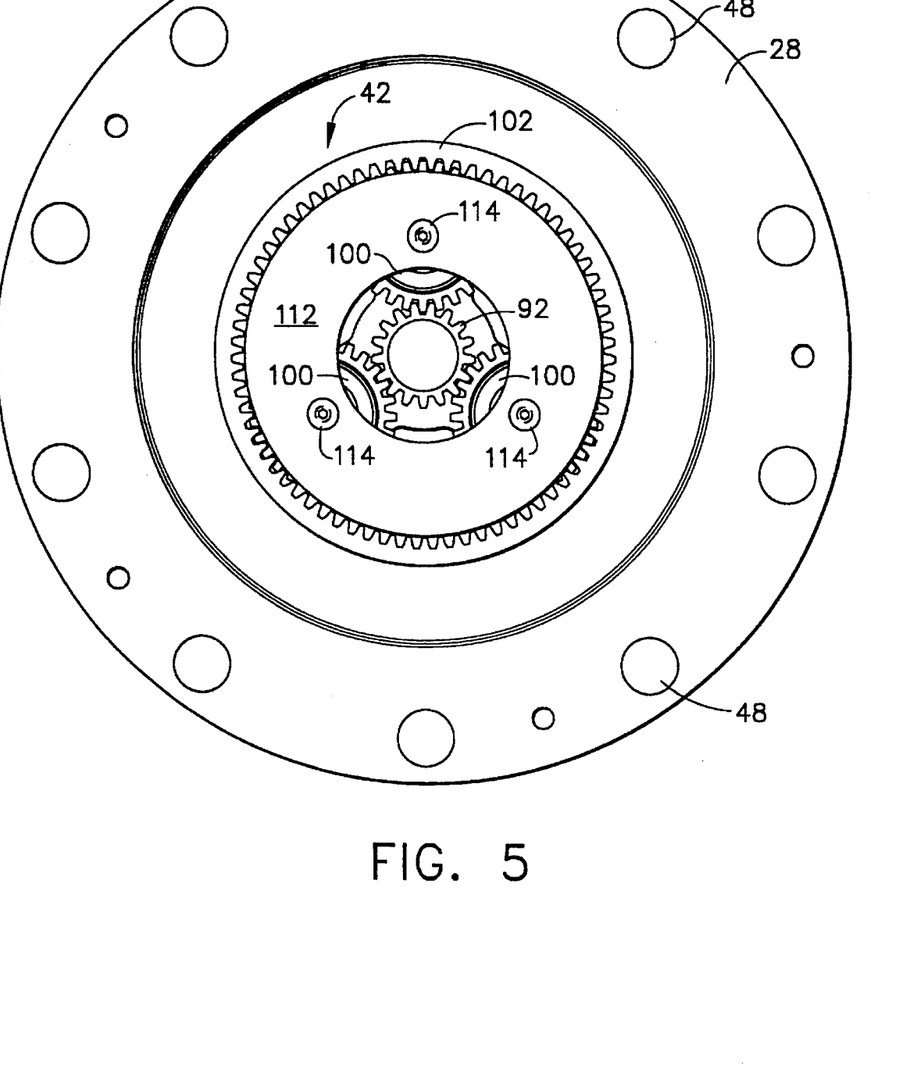
FIG. 5 is a view taken along line 5—5 in FIG. 1 illustrating the outboard gear set of the present invention.

Outboard gear set 42 is illustrated in FIGS. 1 and 5 (which omits wheel 46 and wheel supports 106 and 108) and comprises a sun gear 92 which is integral with an outboard end 94 of intermediate shaft 44, wherein sun gear 92 provides the input to outboard gear set 42. Gear set 42 further comprises a rotatable planet carrier 96 which provides the output of gear set 42, wherein planet carrier 96 includes a plurality of axially extending pins 98. A plurality of planet gears 100 rotate with carrier 96, with each of gears 100 also being rotatable about a corresponding one of pins 98 integral with carrier 96. In a preferred embodiment, carrier 96 is preferably made of a casting which includes axially extending pins 98 and similarly, planet carrier 72 of inboard gear set 40 may be made of a casting which includes axially extending pins 80. A stationary ring gear 102 is splined to the outboard portion 34 of spindle 12 and a retainer nut 104 is threaded onto the outboard portion 34 of spindle 12 wherein retainer nut 104 clamps ring gear 102 against the outboard portion 34 of spindle 12 and retains wheel hub cartridge bearing 30 between ring gear 102 and the inboard portion 32 of spindle 12. Each of the planet gears 100 mesh with sun gear 92 and ring gear 102. Planet carrier 96 is fixedly attached to wheel hub 28 by bolts 48 and is operably affixable to wheel supports 106 and 108 which are integral with wheel 46 for the purpose of driving wheel 46. Similar to inboard gear set 40, planet gears 100 are rotatably mounted to pins 98 of carrier 96 by a double set of needle bearings 110 and a single thrust washer 112 is positioned between planet gears 100 and ring gear 102 and is fixedly attached to each of pins 98 of carrier 96 using screws 114. Thrust washer 112 restrains each of planet gears 100 from moving in an axially inboard direction. The plurality of outboard thrust washers 116 are disposed between planet carrier 96 and planet gears 100 with each of washers 116 being keyed to carrier 96 by an inner J-shaped lip and restraining a corresponding one of gears 100 from moving in an axially outboard direction. A thrust bearing 118, comprising radially oriented roller bearings, is disposed between outboard portion 34 of spindle 12 and outboard gear set 42 for reacting thrust loads imposed by gear set 42.

The relative positions of spindle 12, wheel hub cartridge bearing 30 and wheel hub 28, as well as the curvilinear configuration of wheel hub 28 allows the present invention to advantageously transmit the partial vertical weight of the vehicle (not shown) to the vehicle suspension system 14 in a manner wherein the load path bypasses outboard gear set 42 and thereby avoids undesirable gear mesh deflections and the associated noise. A partial weight of the vehicle is transferred from a ground engaging tire (not shown) through individual wheel 46 and wheel supports 106 and 108 to rotatable wheel hub 28 and then to suspension system 14 through cartridge bearing 30 and spindle 12, wherein bearing 30 is journaled on spindle 12. Cartridge bearing 30 further comprises a pair of axially spaced tapered roller bearings 120 and 122 which are disposed between rotatable outer race 36 and a stationary inner race 124 of bearing 30. Cartridge bearing 30 is preferably optimally positioned such that a vertical centerline (not shown) of bearing 30 is aligned with a centerline (not shown) of the ground engaging tire (also not shown) for providing the required optimum load distribution and maximum bearing life during vehicle operation. Given the optimum location of cartridge bearing 30, the fact that inboard gear set 40 and outboard gear set 42 are axially spaced apart, or split, provides the following advantages. If outboard gear set 42 was positioned axially adjacent to inboard gear set 40 on the inboard side of intermediate shaft 44, the length of the wheel end assembly 10 extending from the vertical centerline of cartridge bearing 30 to the end plate assembly 50 would necessarily be increased to accommodate gear set 42. Consequently, wheel end assembly 10 would be disposed farther inboard towards the horizontal centerline (not shown) of the associated vehicle. For commercial applications which are anticipated which include utilizing wheel end assembly 10 to drive an individual wheel of a commercial bus, such a change in configuration would result in less space being available for the width of the passenger aisle of the bus. Additionally, if gear set 42 was positioned adjacent to gear set 40 on the .inboard side of intermediate shaft 44, the speed of intermediate shaft 44 would be reduced and the corresponding torque input to intermediate shaft 44 would be increased, relative to the speed and torque input associated with shaft 44 of the present invention. This would require an increased diameter of intermediate shaft 44 which, given that the size of cartridge bearing 30 would remain unchanged, would result in a reduced radial thickness of the inboard portion 34 of spindle 12 which could compromise the ability of wheel end assembly 10 to transmit the partial vertical load of the vehicle to suspension 14.

Figure 6:
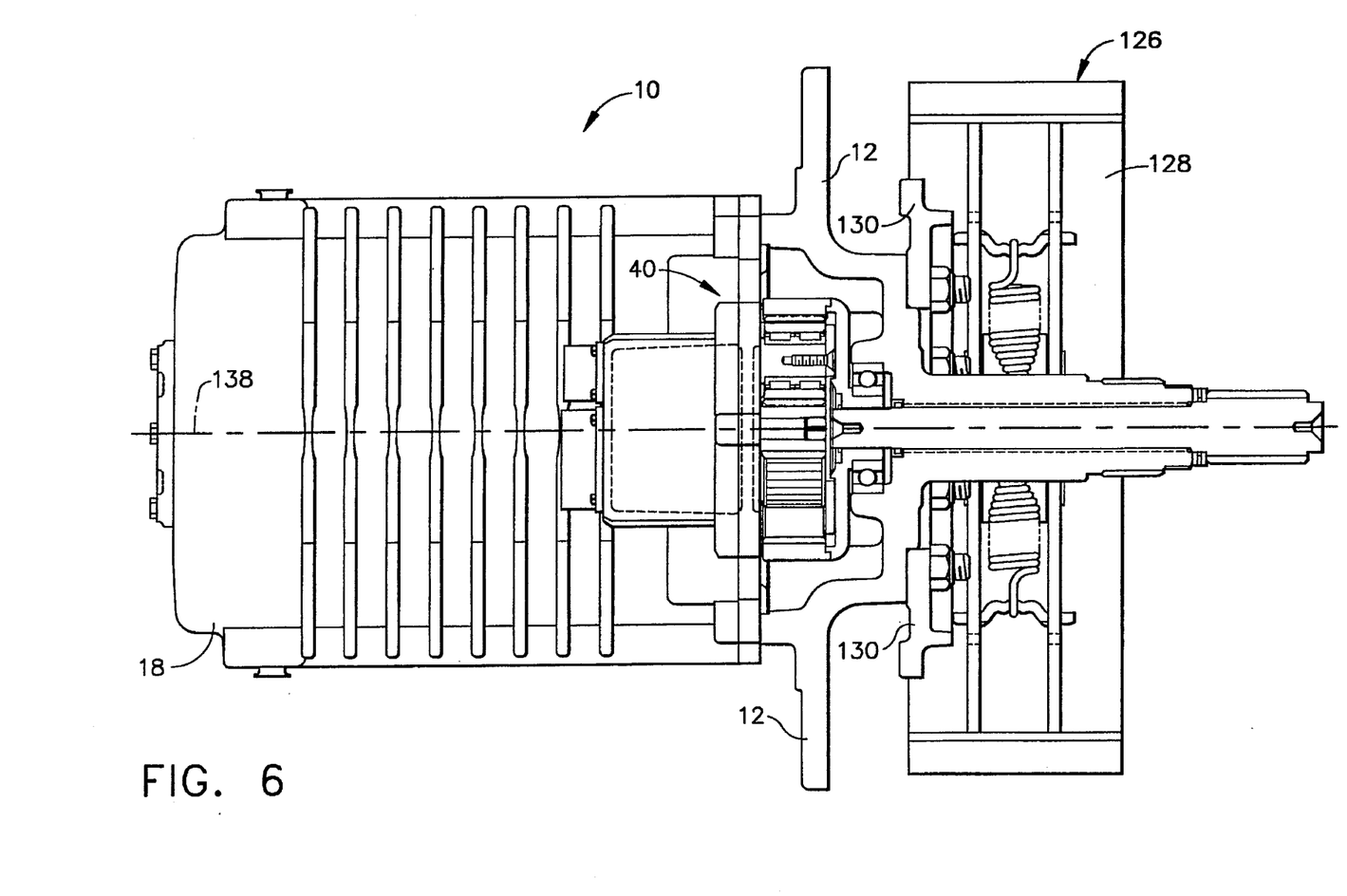
FIG. 6 is a longitudinal, partial cutaway view illustrating the integration of the brake of the present invention wherein the outboard gear set of the preferred wheel assembly has been removed.
Figure 7:
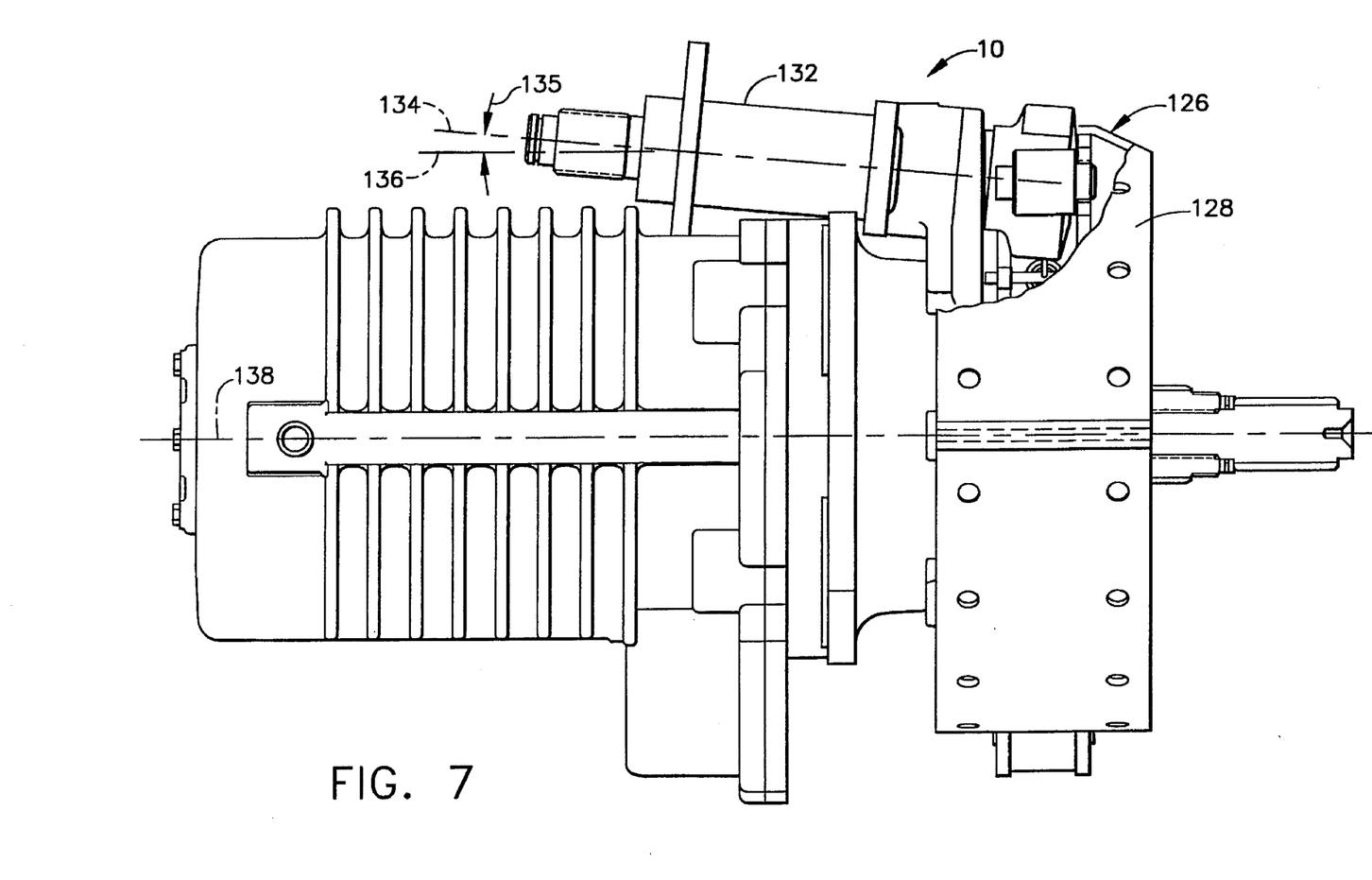
FIG. 7 is a plan view further illustrating the brake of the present invention wherein the outboard gear set of the preferred wheel assembly has been removed.

The spacial separation of inboard gear set 40 and outboard gear set 42 as well as the disposition of cartridge bearing 30 between gear sets 40 and 42 and the attachment of wheel hub 28 to the outboard end 37 of bearing 30 also advantageously allows brake 126 of wheel end assembly 10 to be disposed between gear sets 40 and 42. The integration of brake 126, which is not shown in FIG. 1, is illustrated in FIGS. 6 and 7. As shown in FIG. 6, brake 126 comprises a brake housing 128 which is disposed in surrounding relationship with, and radially separated from, cartridge bearing 30 and a spider 130 which mounts brake 126 to spindle 12. Brake 126 is conventional in nature and further comprises an S-shaped cam (not shown) which is disposed within a cam housing 132, wherein the S-shaped cam forces brake shoe linings (not shown) radially outward against a brake drum (also not shown) in a conventional manner. As shown in FIG. 7, cam housing 132 protrudes from brake housing 128 and includes a longitudinal centerline 134 which is inclined at an angle 135 relative to axis 136 which is generally parallel to a longitudinal centerline 138 of motor 18. Angle 135° is contemplated as being preferably from about 3° to about 10° and most preferably 5°. The inclination of cam housing 132 is provided to avoid interference with housing 26 of motor 18. The disposition of brake 126 between inboard gear set 40 and outboard gear set 42 and in surrounding relationship with cartridge bearing 30 further enhances the packaging efficiency of wheel end assembly 10.

Referring back to FIG. 1, wheel end assembly 10 further comprises a means 140 for lubricating motor 18 and inboard gear set 40 wherein lubricating means 140 comprises a first inlet port 142 formed in a radially outer wall 144 of exterior housing 26 of motor 18. First inlet port 142 is in flow communication with an axially extending distribution tube 146 located in outer wall 144. Lubricating means 140 further comprises an interior supply port 148 formed in exterior housing 26 with port 148 being in flow communication with an inboard end 150 of distribution tube 146 and a cavity 152 containing windings 154 of motor stator 20. Distribution tube 146 has an outboard end 156 which is in flow communication with cavity 152. Lubricating means 140 further comprises a second inlet port 158 which is formed through an end cap bushing 160 of end plate assembly 50, wherein bushing 160 is inserted into the inboard end 58 of output shaft 24 of motor 18. Lubricating fluid 178 comprising commercially available oil coolant is supplied to first inlet port 142 and second inlet port 160 by an external source, which is not part of the present invention, including an oil pump and an oil cooler mounted to the associated vehicle (all not shown). Lubricating means 140 further comprises an axially extending passage 162 which is formed through the center of output shaft 24 of rotor 22, wherein passage 162 is in flow communication with the second inlet port 160. A drain port 164 is formed in exterior housing 26 of motor 18 with drain port 164 being generally diametrically opposed from the first inlet port 142. Drain port 164 is in flow communication with a drain tube 166, wherein drain tube 166 is in flow communication with cavity 152 containing the windings 154 of stator 20. The symmetry created by diametrically opposed first inlet port 142 and drain port 164, as well as that associated with distribution tube 146 and drain tube 166, allows wheel end assembly 10 to be used to drive an individual wheel located on either side of the vehicle, wherein first supply port 142 and drain port 164 are configured as shown to drive a wheel on a first side of the vehicle, wherein drain port 164 becomes the first inlet port and first inlet port 142 becomes the drain port when wheel end assembly 10 is used to drive a wheel on the opposite side of the vehicle.

Figure 3:
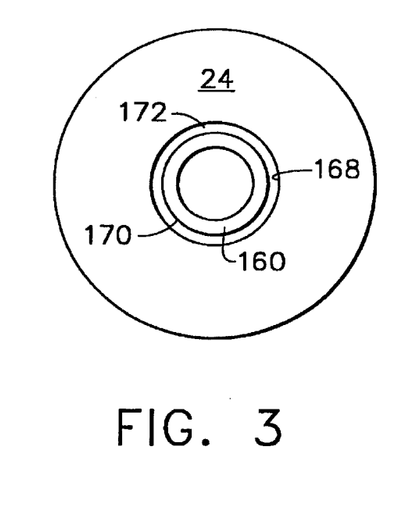
FIG. 3 is an enlarged view illustrating the spatial relationship between the end cap bushing and the motor output shaft shown in FIG. 1.

End cap bushing 160 and a radially inner surface 168 of output shaft 24 are disposed radially relative to one another, as illustrated in the enlarged view of FIG. 3, so as to control the flow of lubricating fluid between an outer surface 170 of bushing 160 and the radially inner surface 168 of output shaft 24. It is desirable to prevent lubricating fluid from flowing between bushing 160 and shaft 24 into the cavity containing encoder 54 and to thereby direct virtually all of the lubricating fluid entering second inlet port 158 through passage 162. Accordingly, bushing 160 and shaft 24 are separated by a very small annular clearance 172, wherein in a preferred embodiment bushing 160 and shaft 24 are separated radially by approximately 0.001 inches (0.00254 mm) although the exact clearance should not be limiting. Accordingly, bushing 160 is essentially sealed to output shaft 24 while avoiding seal drag which would occur if bushing 160 were sealed to output shaft 24 using a conventional seal such as an O-ring, thereby avoiding a reduction in motor efficiency associated with seal drag.

Lubricating means 140 further comprises first and second pluralities, 174 and 176 respectively, of circumferentially spaced and radially extending passages which are formed in output shaft 24 and are in flow communication with the axially extending passage 162 formed through output shaft 24. Passages 174 and 176 are axially spaced apart from one another with passages 174 being disposed so as to supply lubricating fluid 178, which enters passage 162 through first inlet port 158, to an inboard end 180 of windings 154 of stator 20. Passages 176 are disposed so as to impinge lubricating fluid 178 on an inboard end 182 of rotor 22.

Lubricating means 140 further comprises a third, fourth and fifth plurality of circumferentially spaced and radially extending passages, 184, 186 and 188 respectively, which are formed in output shaft 24 and are in flow communication with passage 162. Passages 184, 186 and 188 are axially spaced relative to one another. Passages 184 are disposed so as to supply lubricating fluid to an outboard end 190 of windings 154 of stator 20 and passages 186 are disposed so as to impinge lubricating fluid 178 on an outboard end 192 of rotor 22. Passages 188 are disposed so as to supply lubricating fluid 178 to the inboard gear set 40. Lubricating means 140 also includes a bushing 194 which is disposed in passage 162 of output shaft 24, wherein bushing 194 has an orifice 196 which is in flow communication with passage 162. Orifice 196 directs lubricating fluid 178 onto an inboard surface of intermediate shaft 44. A plurality of inclined passages 200 are formed through a connecting portion 202 of ring gear 78 of gear set 40, wherein inclined passages 200 are in flow communication with orifice 196 and a roller bearing 204 which is disposed between the inboard portion 32 of spindle 12 and ring gear 78. Roller bearing 204 rotatably mounts ring gear 78 and intermediate shaft 44 to spindle 12 for supporting ring gear 78 and intermediate shaft 44. A seal 206 is disposed outboard of ring gear 78 of inboard gear set 40 with seal 206 being in sealing engagement with spindle 12 and intermediate shaft 44. Accordingly, seal 206 prevents lubricating fluid 178 from migrating outboard between spindle 12 and shaft 44 towards the outboard gear set 42.

Lubricating means 140 comprises a forced lubrication system for lubricating motor 18 and inboard gear set 40. It should be understood that lubricating means 140 may be applied to a motor and single reduction gear set assembly comprising motor 18, gear set 40 and an appropriate cover plate assembly. Outboard gear set 42 is not lubricated by lubricating means 140 but instead is lubricated by conventional splash lubrication, wherein lubricating fluid is filled and drained through fitting 208 formed in planet carrier 96 of outboard gear set 42.

In operation, wheel end assembly 10 may be used to drive wheel 46 of the vehicle (not shown) as follows. Varying current is supplied to motor 18, by a computerized control unit (not shown) causing output shaft 24 of rotor 22 to rotate at a relatively high speed which is anticipated to be in the range of about 3,000 to about 15,000 rpm. Sun gear 74, which is integral with output shaft 24 of motor 18, provides the input to inboard speed reduction gear set 40 which is connected coaxially between output shaft 24 and intermediate shaft 44. Ring gear 78 provides the output of gear set 40 and drives intermediate shaft 44, causing intermediate shaft 44 to rotate in response to the rotation of output shaft 24 at a speed of rotation less than the speed of rotation of output shaft 24. In a preferred embodiment, inboard speed reduction gear set 40 achieves a speed reduction ratio of 4.29 to 1. Sun gear 92, which is integral with intermediate shaft 44 provides the input to outboard speed reduction gear set 42. Outboard gear set 42 is connected coaxially between intermediate shaft 44 and wheel hub 28, with planet carrier 96 providing the output of gear set 42, for rotating wheel hub 28 and wheel 46, which is operably affixable to wheel hub 28, at a speed of rotation which is less than the speed of rotation of intermediate shaft 44. In a preferred embodiment, outboard speed reduction gear set 42 achieves a speed reduction ratio of 5.29 to 1. Consequently, wheel end assembly 10 achieves an overall speed reduction ratio of 22.69 to 1. However, it is anticipated that the speed reduction ratios of either or both of gear sets 40 and 42 may be varied to achieve an overall speed reduction ratio of wheel end assembly 10 in the range of approximately 17 to 1 to 30 to 1.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, the means for lubricating the motor and inboard speed reduction gear set of the present invention may be advantageously utilized to provide forced lubrication for a wheel end assembly utilizing an electric motor and a single speed reduction gear set, as opposed to the double reduction gear sets utilized by the present invention. The particular orientation of the brake assembly of the present invention may advantageously be utilized in other applications such as a wheel end assembly for driving an individual wheel of a motor vehicle, wherein the gear set or gear sets of the wheel end assembly are driven by a motive power source other than an electric motor, or in applications wherein the motor vehicle utilizes a conventional transaxle assembly for driving opposing wheels of the motor vehicle. Further, the diameter and design of the various gears as well as the number of planetary gears employed in the present invention may be varied without affecting the teachings of the present invention. The protection desired to be secured by Letters Patent of the United States for this invention is defined by the subject matter of the following claims.

What is claimed is:

1. A wheel end assembly for driving an individual wheel of a motor vehicle, said assembly comprising:
   a) a stationary, annular spindle, said spindle being operably affixable to said vehicle;
   b) an electric motor having a stator and a rotor, said rotor including a rotary output shaft, said motor being supported by said spindle and disposed inboard of and coaxially with said spindle;
   c) a wheel hub rotatably mounted to and coaxial with said spindle;
   d) a wheel hub cartridge bearing disposed between an enlarged diameter inboard portion of said spindle and said wheel hub, said wheel hub cartridge bearing being further disposed in surrounding relationship with a reduced diameter outboard portion of said spindle, said wheel hub being fixedly attached to a rotatable outer race of said wheel hub cartridge bearing;
   e) an inboard speed reduction gear set mounted within said enlarged diameter inboard portion of said spindle and coaxially with said spindle, said inboard gear set connected coaxially between said output shaft of said motor and an intermediate shaft for rotating said intermediate shaft in response to rotation of said output shaft at a speed of rotation less than the speed of rotation of said output shaft; and
   f) an outboard speed reduction gear set which is coaxial with said spindle, said outboard gear set connected coaxially between said intermediate shaft and said wheel hub for rotating said wheel hub and said wheel of said vehicle, which is operably affixable to said wheel hub, at a speed of rotation which is less than the speed of rotation of said intermediate shaft.

2. The wheel end assembly as recited in claim 1, wherein said inboard speed reduction gear set comprises:
   a) a sun gear which is integral with said output shaft of said motor, said sun gear providing the input to said inboard gear set;
   b) a stationary planet carrier having a plurality of axially extending pins;
   c) a plurality of planet gears, each of said planet gears being rotatable about a corresponding one of said pins; and
   d) a rotatable ring gear which provides the output of said inboard gear set;
   e) wherein each of said planet gears mesh with said sun gear and said ring gear, said ring gear also meshing with splines formed on an inboard end of said intermediate shaft;
   f) wherein said planet carrier is supported by said spindle.

3. The wheel end assembly as recited in claim 2, wherein said outboard speed reduction gear set comprises:
   a) a sun gear which is integral with an outboard end of said intermediate shaft, said sun gear providing the input to said outboard gear set;
   b) a rotatable planet carrier having a plurality of axially extending pins, said planet carrier providing the output of said outboard gear set;
   c) a plurality of planet gears, each of said planet gears rotating with said planet carrier and rotatable about a corresponding one of said pins;
   d) a stationary ring gear which is splined to said outboard portion of said spindle;
   e) wherein each of said planet gears mesh with said sun gear and said ring gear and wherein said planet carrier is fixedly attached to said wheel hub and is operably affixable to said wheel of said vehicle.

4. The wheel end assembly as recited in claim 3, wherein:
   a) each of said planet gears of said inboard gear set is restrained from moving in an axially outboard direction by a first thrust washer positioned between said planet gears and said ring gear of said inboard gear set;
   b) each of said planet gears of said outboard gear set is restrained from moving in an axially inboard direction by a second thrust washer which is positioned between said planet gears and said ring gear of said outboard gear set;
   c) said first thrust washer is fixedly attached to said planet carrier of said inboard gear set and said second thrust washer is fixedly attached to said planet carrier of said outboard gear set.

5. The wheel end assembly as recited in claim 4, said assembly further comprising a retainer nut threaded onto said outboard portion of said spindle, said retainer nut clamping said ring gear of said outboard gear set against said spindle and retaining said cartridge bearing axially between said ring gear of said outboard gear set and said inboard portion of said spindle.

6. The wheel end assembly as recited in claim 3, further comprising:
   a) a first roller bearing disposed between an exterior housing of said motor and an inboard end of said output shaft of said motor for supporting said inboard end;
   b) a second roller bearing disposed between said planet carrier of said inboard gear set and an outboard end of said output shaft for supporting said outboard end;
   c) a third roller bearing disposed between said inboard portion of said spindle and said ring gear of said inboard gear set for supporting said ring gear of said inboard gear set and said intermediate shaft; and
   d) a thrust bearing disposed between said outboard portion of said spindle and said outboard gear set.

7. The wheel end assembly as recited in claim 6, wherein said cartridge bearing further comprises a pair of axially spaced tapered roller bearings, said tapered roller bearings being disposed between said rotatable outer race and a stationary inner race of said cartridge bearing.

8. The wheel end assembly as recited in claim 1, said assembly further comprising a brake, said brake comprising a brake housing disposed in surrounding relationship with said cartridge bearing and a spider which mounts said brake to said spindle.

9. The wheel end assembly as recited in claim 8, wherein said brake further comprises a cam housing, said cam housing protruding from said brake housing and having a longitudinal centerline inclined at an angle of approximately 3°–10° relative to an axis which is generally parallel to a longitudinal centerline of said motor.

10. The wheel end assembly as recited in claim 1, wherein said motor further comprises an exterior housing, said rotor and said stator being enclosed by said exterior housing, said exterior housing engaging said stator in an interference fit along a radially inner and axially extending surface of said exterior housing.

11. The wheel end assembly as recited in claim 1, wherein said assembly further comprises a means for lubricating said motor and said inboard gear set, said lubricating means comprising:

a) a first inlet port formed in a radially outer wall of said exterior housing of said motor, said first inlet port being in flow communication with an axially extending distribution tube located in said outer wall;

b) an interior supply port formed in said exterior housing, said interior supply port being in flow communication with an inboard end of said distribution tube and a cavity containing windings of said stator, said distribution tube having an outboard end in flow communication with said cavity;

c) a second inlet port formed through an end cap bushing inserted into an inboard end of said output shaft of said motor;

d) an axially extending passage formed through said output shaft, said passage being in flow communication with said second inlet port;

e) a drain port formed in said exterior housing, said drain port being generally diametrically opposed from said first inlet port and in flow communication with a drain tube, said drain tube being in flow communication with said cavity containing said windings of said stator;

f) wherein said end cap bushing and a radially inner surface of said output shaft are disposed radially relative to one another so as to control the flow of lubricating fluid between an outer surface of said bushing and said radially inner surface of said output shaft.

12. The wheel end assembly as recited in claim 11, wherein said lubricating means further comprises a first and a second plurality of circumferentially spaced and radially extending passages formed in said output shaft and in flow communication with said axially extending passage formed through said output shaft, said first and second plurality of radially extending passages being axially spaced apart from one another, said first plurality of passages being disposed so as to supply lubricating fluid to an inboard end of said windings of said stator, said second plurality of passages being disposed so as to impinge lubricating fluid on an inboard end of said rotor.

13. The wheel end assembly as recited in claim 12, wherein said lubricating means further comprises a third, a fourth and a fifth plurality of circumferentially spaced and radially extending passages formed in said output shaft and in flow communication with said axially extending passage formed through said output shaft, said third plurality of passages being disposed so as to supply lubricating fluid to an outboard end of said windings of said stator, said fourth plurality of passages being disposed so as to impinge lubricating fluid on an outboard end of said rotor, said fifth plurality of passages being disposed so as to supply lubricating fluid to said inboard gear set.

14. The wheel end assembly as recited in claim 13, wherein said lubricating means further comprises:

a) a bushing disposed in said axially extending passage of said output shaft, said bushing having an orifice in flow communication with said axially extending passage, said orifice directing lubricating fluid onto said intermediate shaft;

b) a plurality of inclined passages formed through a connecting portion of said ring gear of said inboard gear set, said inclined passages in flow communication with said orifice and a roller bearing disposed between said inboard portion of said spindle and said ring gear of said inboard gear set; and c) a seal disposed outboard of said ring gear of said inboard gear set, said seal being in sealing engagement with said spindle and said intermediate shaft.

* * * * *